Jan. 16, 1962 R. A. WIMMER 3,016,855
ALIGNMENT AND WELDING DEVICE
Filed April 8, 1957

INVENTOR.
RUDOLPH A. WIMMER
BY
C. H. Miranda
ATTORNEY

United States Patent Office

3,016,855
Patented Jan. 16, 1962

3,016,855
ALIGNMENT AND WELDING DEVICE
Rudolph A. Wimmer, Westfield, N.J., assignor to Foster Wheeler Corporation, New York, N.Y., a corporation of New York
Filed Apr. 8, 1957, Ser. No. 651,482
4 Claims. (Cl. 113—102)

This invention relates to the welding of tubes and pipes and more particularly to devices usable in the alignment and welding of tubes and pipes.

In the welding of tubes, particularly by means of butt welds, it is essential that the tubes are in axial alignment in order that the ends may be in proper position for a weld of uniform width and depth. Such precautions are necessary to prevent imperfect welds, such as may be caused by misalignment of the tubes or variations in the distance between adjacent surfaces to be welded. Various forms of clamps and jigs for holding tube and pipe sections in position are presently employed but they are objectionable, in many instances, because they are cumbersome and of complex and expensive construction.

It is an object of the present invention to provide a novel and efficient device for the alignment and welding of tubes and pipes and which is of simple and inexpensive construction.

The present invention, therefore, contemplates a novel device usable in the alignment and welding of tubes and which comprises a cylindrical sleeve of unitary construction. The sleeve has a diameter slightly larger than the tube sections to be welded so that the ends of said tubes may be inserted into the sleeve. The sleeve is provided with apertures or slots to provide access to a welding tool to the interior of the sleeve. Means are disposed on the inside of the sleeve for engaging one of the tube ends to position the sleeve with the slots in alignment with the tube ends so that portions of the tube ends may be tack welded through said slots. In one embodiment of the present invention, the sleeve is of uniform thickness while in a second embodiment, portions of the sleeve are of lesser thickness than the remainder to effect welding of closely spaced tubes arranged in a row.

The above and other objects and advantages of the present invention will appear more fully hereinafter from a consideration of the detailed description which follows, taken together with the accompanying drawings wherein two embodiments of the invention are illustrated.

Figure 1:
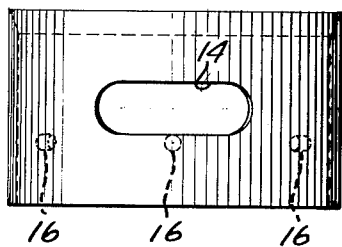
FIG. 1 is an elevational view of a sleeve constituting one embodiment of the invention.
Figure 2:
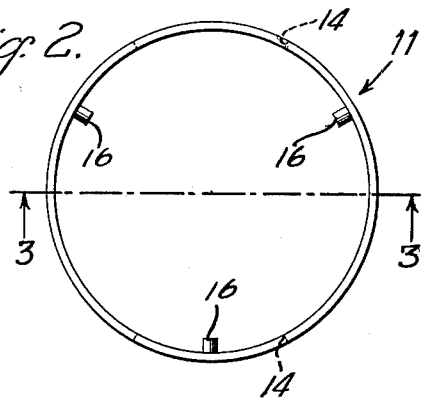
FIG. 2 is a plan view of the sleeve of FIG. 1.

Referring now to the drawings for a more detailed description of the present invention and more particularly to FIG. 1 wherein one embodiment thereof is clearly illustrated, a sleeve, generally designated by the numeral 11, comprises a cylindrically-shaped body 12 having a pair of horizontally extending arcuate-shaped apertures or slots 14. The slots 14 are arranged at diametrically opposite portions of sleeve 11 and are substantially coplanar. Slots 14 are dimensioned to permit a welding tool access to the interior of the sleeve as will be more fully described hereinafter. Projecting lugs 16 are provided on the interior wall of body 12 and are shown as elements welded to the body but the lugs may readily take the form of struck portions of the body readily produced by piercing the body inwardly. Three lugs 16 are shown in the drawings spaced approximately 120° apart in a single plane below slots 14 but the number of lugs and the distances therebetween may be varied without departing from the spirit and scope of the invention. The upper edge of body 12 is provided with a bevelled surface 18 which is inclined toward the longitudinal axis of the sleeve.

Figure 4:
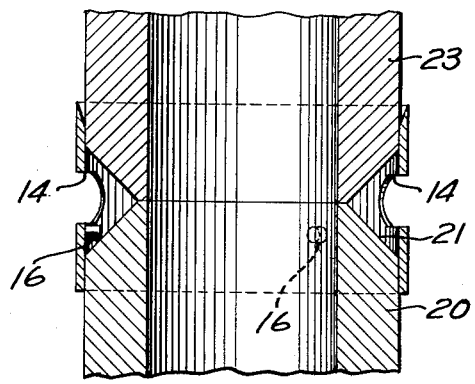
FIG. 4 is a fragmentary sectional view, in elevation, of the novel sleeve of FIG. 1 and a pair of tube ends inserted in the sleeve.
Figure 3:
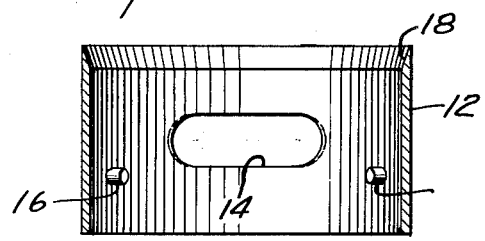
FIG. 3 is a sectional view in elevation and taken along the line 3—3 of FIG. 2.

FIG. 4 illustrates the cooperation of sleeve 11 with a pair of tube ends which are to be butt welded in accordance with the present invention. Sleeve 11, as seen in FIG. 4, is seated on a tube 20 and is maintained in the position shown by lugs 16 which engage a bevelled surface 21 of tube 20. Lugs 16, as one function thereof, serve to limit the length of tube 20 in sleeve 11 and provide a space in the upper portion of the sleeve for accommodating an end of a second tube 23. The slots 14 and lugs 16 are spaced apart a predetermined amount so that when the lugs engage bevelled surface 21 of tube 20, the slots 14 are disposed in alignment with the tube ends to be welded. In this manner, the tube ends are held together in proper axial alignment so that the ends may be tack welded at diametrically opposite portions by a welding tool which operates through slots 14.

One application of the present invention is readily found in the construction of tube walls for large steam boilers where the tubes are arranged upright in vertical rows. A panel-like section of a tube wall is illustrated by way of example in FIG. 5 wherein the tubes 25 are connected at opposite ends to upper and lower transversely extending tubular vessels 27 and 28, respectively, designated in the steam generating art as headers. In the fabrication of the tube sections, the procedure is to construct the section in two parts in the shop because of the length of the tubes which causes difficulty in transporting complete sections to the steam boiler erection site. Present practice is to weld in the shop tubes, which are less than the required length, as for example one half the length, to the upper header and to weld to the lower header tubes which constitute, together with the tubes secured to the upper header, the remainder of the required length. The tube section then is transported to the erection site in two parts for assembly. In assembling the two parts, the lower header is held in some suitable manner with the tubes connected thereto arranged upright. The upper header is carried by a hoisting apparatus which lowers the header until the upper and lower tubes are believed to be in alignment. A welder then commences to weld adjacent ends of the upper and lower corresponding tubes to produce a single tube section. The foregoing practice has one serious objection, however, in that adjacent ends of corresponding tubes, in many instances, are misaligned prior to welding and, as a result, the tube joints are poorly welded.

The above procedure is expedited by the use of the sleeve of the present invention and the possibility of improper welds due to misalignment is largely obviated. In utilizing the present invention, the lower header is secured with the tubes in an upright position. An operator then places or seats a sleeve 11 on the ends of each of the lower tubes, as seen in FIG. 4, with the lugs 16 engaging the bevelled surfaces of such tubes. Thereafter, the upper header is lowered and the ends of the tubes connected thereto are inserted into the sleeves 11. It will be seen that the bevelled surface 18 of sleeve 11 provides for quick insertion and guiding of the ends of the upper tubes into the sleeves and the ends of the tubes are confined by this sleeve in proper axial alignment. The tube ends then are ready for tack welding through slots 14 which are in alignment with the tube ends. After the tube ends are positioned in the sleeve 11, an operator produces a tack weld on the tube ends in those portions in alignment with slots 14 by use of a suitable welding tool. The tack welds thus produced are sufficient to hold the tube ends in proper alignment without completely welding the entire periphery of the tube ends. The sleeves then are removed, as for example by cutting, after which an operator completes the welding of the tube ends.

Figure 5:
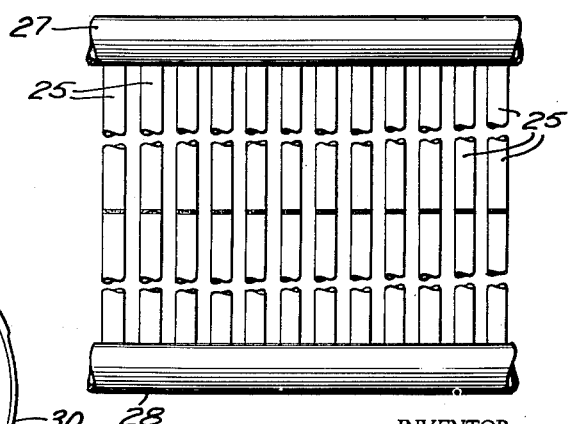
FIG. 5 is a front elevational view of a row of tubular members and illustrates one application of the sleeve of the present invention.
Figure 6:
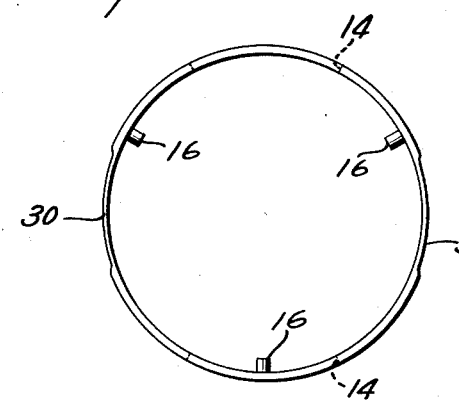
FIG. 6 is a plan view of a sleeve constituting a second embodiment of the invention.

FIG. 6 discloses a second embodiment of the invention which has particular utility in the welding of ends of tubes which are to be arranged closely together as to be almost in contact one with the other. In the steam boiler art, for example, tube walls of the type illustrated in FIG. 5 are provided with substantially tangent tubes which may be spaced apart only fractions of an inch. In welding the ends of the mentioned tangent tubes, the sleeve 11 shown in FIG. 6 is employed and is provided with two diametrically opposed and longitudinally extending portions 30 of lesser thickness than the other wall portions of sleeve body 12. Portions 30 lie in a plane normal to that plane containing the slots 14. When the sleeves 11 of FIG. 6 are inserted on the ends of the tubes of the lower header, it is evident that the sleeves are arranged so that portions 30 are disposed in the plane of the row of tubes while slots 14 face outwardly or away from the plane containing the row of tubes.

It is to be understood that the number of slots 14 may be changed and the slots may extend longitudinally rather than horizontally, as shown, to suit conditions of use which dictate such changes. The length of the slots also may be varied either less or greater than that shown, as long as the rigidity or strength of the sleeve is not diminished to a point where it is subject to failure in holding the tube ends in axial alignment prior to the tack welding. Furthermore, the present invention is not to be construed as limited to the welding of tube ends in the boiler art alone or even upright or vertical tubes because the invention is readily applicable to tubes and pipes of considerable wall thicknesses and larger diameters and those in other than upright positions.

The sleeve of the present invention has been described hereinabove with reference to butt welding without a backing ring. However, the sleeve is just as readily applicable to butt welding with backing rings as will be readily apparent to those skilled in the art.

It is now apparent that the present invention provides a novel sleeve for the welding and alignment of tube ends and which sleeve is of exceedingly simple construction. The subject sleeve is inexpensive and involves a minimum of labor cost in its use so that its disposable nature is more than adequately compensated by the low cost in labor and fabrication. By utilizing the sleeve of the present invention, alignment prior to welding is easily and properly accomplished with a minimum expenditure of time and greatly obviates the occurrence of poorly welded tube and pipe joints.

Although two embodiments of the invention have been illustrated and described in detail, it is to be expressly understood that the invention is not limited thereto. Various changes can be made in the design and arrangement of the parts without departing from the spirit and scope of the invention as the same will now be understood by those skilled in the art.

What is claimed is:

1. A device for use in the welding of adjacent bevelled ends of a pair of tubes, comprising a unitary sleeve of slightly larger diameter than a pair of tubes to be welded to accommodate the ends of said tubes therein, said sleeve having slots formed therein to permit a welding tool access to the interior of the sleeve, and means on the sleeve to engage the bevelled end of one of said tubes to align the slots with the tube ends to permit welding of the latter through said slots.

2. A device for use in the welding of adjacent bevelled ends of a pair of tubes, comprising a unitary sleeve of slightly larger diameter than a pair of tubes to be welded to accommodate the ends of said tubes therein, said sleeve having at least two slots formed therein to permit a welding tool access to the interior of the sleeve, said slots being disposed in a plane extending transversely of the longitudinal axis of said sleeve, a plurality of coplanar lugs on said sleeve and disposed in a plane parallel to the plane containing the slots, said lugs engaging the bevelled end of one of said tubes to align the slots with the tube ends to permit welding of the latter through said slots.

3. A device for use in the alignment and welding of adjacent bevelled ends of upper and lower upright tubes to form a single tube, comprising a thin-walled, cylindrical-shaped unitary sleeve of slightly larger diameter than the upright tubes to be welded and adapted for seating on the end of the lower tube, slots formed in said sleeve to provide a welding tool access to the interior of the sleeve, means formed on the sleeve for engaging the bevelled end of the lower tube to maintain the sleeve thereat and to space the end of the lower tube sufficiently from the upper edge of the sleeve to provide a space in the sleeve for receiving the end of the upper tube, and a bevelled surface formed at the upper edge of the sleeve for guiding the end of the upper tube into the sleeve, the engaging means positioning the sleeve with the slots thereof in alignment with the tube ends to permit welding of the latter through said slots.

4. A device for use in the alignment and welding of adjacent bevelled ends of upper and lower upright tubes closely spaced together in a row, comprising a thin-walled, cylindrical-shaped unitary sleeve of slightly larger diameter than the tubes to be welded and adapted for seating on the end of the lower tube, a pair of diametrically opposed slots formed in said sleeve to provide a welding tool access to the interior of the sleeve, said sleeve being of uniform thickness except at two diametrically opposed parts spaced intermediate the slots, means formed on the sleeve for engaging the bevelled end of the lower tube to maintain the sleeve thereat and to space the end of the lower tube sufficiently from the upper edge of the sleeve to provide a space in the sleeve for receiving the end of the upper tube, and a bevelled surface formed at the upper edge of the sleeve for guiding the end of the upper tube into the sleeve, the engaging means positioning the sleeve with the slots thereof in alignment with the tube ends to permit welding of the latter through said slots.

References Cited in the file of this patent

UNITED STATES PATENTS

| | | |
|---|---|---|
| 1,515,785 | McDonald | Nov. 18, 1924 |
| 1,980,561 | Wagner | Nov. 13, 1934 |
| 2,002,877 | Barrington | May 28, 1935 |
| 2,127,828 | Milton | Aug. 23, 1938 |